US012689438B2

(12) United States Patent
Sonoda et al.

(10) Patent No.: US 12,689,438 B2
(45) Date of Patent: Jul. 21, 2026

(54) USER SATELLITE, RELAY SATELLITE, SATELLITE SYSTEM AND COMMUNICATION METHOD

(71) Applicant: Warpspace, INC., Ibaraki (JP)

(72) Inventors: Takehiko Sonoda, Saitama (JP); Masanori Seki, Ibaraki (JP)

(73) Assignee: Warpspace, Inc., Ibaraki (JP)

( * ) Notice: Subject to any disclaimer, the term of this patent is extended or adjusted under 35 U.S.C. 154(b) by 232 days.

(21) Appl. No.: 18/724,675

(22) PCT Filed: Dec. 28, 2022

(86) PCT No.: PCT/JP2022/048583
§ 371 (c)(1),
(2) Date: Jun. 27, 2024

(87) PCT Pub. No.: WO2023/127953
PCT Pub. Date: Jul. 6, 2023

(65) Prior Publication Data
US 2025/0070875 A1     Feb. 27, 2025

(30) Foreign Application Priority Data
Dec. 28, 2021     (JP) ................................. 2021-215075

(51) Int. Cl.
*H04B 10/00*          (2013.01)
*H04B 10/118*        (2013.01)
*H04B 10/29*          (2013.01)

(52) U.S. Cl.
CPC .......... *H04B 10/118* (2013.01); *H04B 10/29* (2013.01)

(58) Field of Classification Search
CPC . H04B 10/118; H04B 10/112; H04B 10/1121; H04B 10/1123; H04B 10/1125;
(Continued)

(56) References Cited

U.S. PATENT DOCUMENTS 9,042,734 B2 *    5/2015   Makowski ......... H04B 10/1123
398/118
2001/0009466 A1   7/2001   Shiratama
(Continued)

FOREIGN PATENT DOCUMENTS

JP        2001-203641        7/2001
JP        2016-100855        5/2016
(Continued)

OTHER PUBLICATIONS

Baister et al. "Why Optical Communication Links are Needed for Future Satellite Constellations", IEEColloquium on What's New in Satellite Communications, (6):10 Pages, Apr. 17, 1996.

*Primary Examiner* — Hanh Phan

(57)          ABSTRACT

There is provided a technique for implementing instantly responsive communication flexibly by setting communication occasions in an on-demand manner that are not included in a communication plan scheduled in advance for inter-satellite optical communication. One aspect of the present disclosure relates to a satellite including an optical signal obtainer that captures an optical beacon transmitted from a relay satellite in response to a communication request received from an earth station, an image processor that retrieves a bright spot in a captured image frame, an optical beacon detector that detects the optical beacon based on a flickering state of the retrieved bright spot, and an optical communicator that establishes inter-satellite optical communication with the relay satellite based on the detected optical beacon.

12 Claims, 16 Drawing Sheets

(58) Field of Classification Search
CPC ........................ H04B 10/1127; H04B 10/1129;
H04B 10/29; H04B 10/40; H04B 10/116;
H04B 10/114; H04B 10/1143; H04B
10/1149; H04B 10/0795; H04B 7/18513;
H04B 7/18521; H04B 7/18515
USPC ....... 398/118, 119, 120, 121, 122, 123, 124,
398/125, 126, 127, 128, 129, 130, 131,
398/135, 136, 33, 38, 115, 158, 159, 172;
455/427, 428, 12.1, 13.1
See application file for complete search history.

(56) References Cited

U.S. PATENT DOCUMENTS

| | | | |
|---|---|---|---|
| 2016/0149666 A1 | 5/2016 | Tanimura | |
| 2017/0302377 A1* | 10/2017 | Boroson | ............ H04B 10/5161 |
| 2021/0306069 A1 | 9/2021 | Yan et al. | |
| 2023/0019858 A1* | 1/2023 | Scott | .................... H04B 10/112 |
| 2023/0040954 A1 | 2/2023 | Hayashi | |

FOREIGN PATENT DOCUMENTS

| | | |
|---|---|---|
| JP | 2021-103820 | 7/2021 |
| WO | WO 2019/017982 | 1/2019 |

\* cited by examiner

| LABEL NUMBER | AREA | GRAVITY COORDINATES | | SIZE | | CIRCULARITY | ABSOLUTE MAXIMUM LENGTH |
|---|---|---|---|---|---|---|---|
| | | X | Y | X | Y | | |
| 1 | 11 | 11 | 98 | 3 | 3 | 1.0 | 3.7 |
| 2 | 13 | 376 | 128 | 4 | 4 | 1.0 | 4.0 |
| 3 | 8 | 376 | 155 | 3 | 3 | 1.0 | 3.2 |
| 4 | 17 | 99 | 175 | 5 | 5 | 1.0 | 4.7 |
| 5 | 19 | 455 | 221 | 8 | 8 | 1.9 | 11.3 |
| 6 | 13 | 583 | 247 | 4 | 4 | 1.0 | 4.0 |
| 7 | 32 | 111 | 276 | 6 | 5 | 1.2 | 6.5 |
| 8 | 16 | 277 | 298 | 5 | 4 | 1.2 | 4.5 |
| .. | | | | | | | |
| N | 11 | 545 | 461 | 3 | 3 | 1.0 | 3.7 |

FIG. 7

| LABEL NUMBER | AREA | GRAVITY COORDINATES | | SIZE | | CIRCULARITY | ABSOLUTE MAXIMUM LENGTH |
| --- | --- | --- | --- | --- | --- | --- | --- |
| | | X | Y | X | Y | | |
| 1 | 11 | 11 | 98 | 3 | 3 | 1.0 | 3.7 |
| 2 | 13 | 376 | 128 | 4 | 4 | 1.0 | 4.0 |
| 4 | 17 | 99 | 175 | 5 | 5 | 1.0 | 4.7 |
| 6 | 13 | 583 | 247 | 4 | 4 | 1.0 | 4.0 |
| 8 | 16 | 277 | 298 | 5 | 4 | 1.2 | 4.5 |
| .. | | | | | | | |
| M | 11 | 545 | 461 | 3 | 3 | 1.0 | 3.7 |

FIG. 8

| TRACKING NUMBER | STATE | TYPE | AREA | GRAVITY COORDINATES | | SIZE | | CIRCULARITY | ABSOLUTE MAXIMUM LENGTH |
|---|---|---|---|---|---|---|---|---|---|
| | | | | X | Y | X | Y | | |
| 1 | TRACKING | STAR | 11 | 11 | 98 | 3 | 3 | 1.0 | 3.7 |
| 2 | UNKNOWN | UNKNOWN | 13 | 376 | 128 | 4 | 4 | 1.0 | 4.0 |
| 3 | TRACKING | OPTICAL BEACON CANDIDATE | 17 | 99 | 175 | 5 | 5 | 1.0 | 4.7 |
| 4 | TRACKING | STAR | 13 | 583 | 247 | 4 | 4 | 1.0 | 4.0 |
| 5 | UNKNOWN | UNKNOWN | 16 | 277 | 298 | 5 | 4 | 1.2 | 4.5 |
| 6 | TRACKING | OPTICAL BEACON CANDIDATE | 12 | 164 | 397 | 4 | 4 | 1.0 | 3.9 |
| .. | | | | | | | | | |
| M | TRACKING | STAR | 11 | 545 | 461 | 3 | 3 | 1.0 | 3.7 |

FIG. 9

| TRACKING NUMBER | STATE | TYPE | PRESENCE OF PARTICLE | PARTICLE CONFIRMATION TIME | AREA | GRAVITY COORDINATES | |
|---|---|---|---|---|---|---|---|
| | | | | | | X | Y |
| 1 | TRACKING | STAR | PRESENT | 16:50:51 | 11 | 11 | 98 |
| 2 | TRACKING | OPTICAL BEACON CANDIDATE | PRESENT | 16:52:13 | 13 | 376 | 128 |
| 3 | TRACKING | OPTICAL BEACON CANDIDATE | PRESENT | 16:51:43 | 17 | 99 | 175 |
| 4 | TRACKING | STAR | PRESENT | 16:52:08 | 13 | 583 | 247 |
| 5 | TRACKING | OPTICAL BEACON CANDIDATE | PRESENT | 16:52:13 | 16 | 277 | 298 |
| 6 | TRACKING | OPTICAL BEACON CANDIDATE | PRESENT | 16:55:38 | 12 | 164 | 397 |
| .. | | | | | | | |
| M | TRACKING | STAR | PRESENT | 16:51:59 | 11 | 545 | 461 |

COMMUNICATOR

220

OPTICAL SIGNAL
TRANCEIVER

230

OPTICAL
COMMUNICATOR

240

COMMUNICATION
CONTROLLER

USER SATELLITE, RELAY SATELLITE, SATELLITE SYSTEM AND COMMUNICATION METHOD

TECHNICAL FIELD

The present disclosure relates to a user satellite, a relay satellite, a satellite system and a communication method.

BACKGROUND ART

An earth station and a user satellite (for example, an observation satellite, a communication satellite, and so on) can communicate with each other via a relay satellite. In the communication between the earth station and the user satellite via the relay satellite, the user satellite and the relay satellite exchange data in inter-satellite communication. In this inter-satellite communication, utilization of inter-satellite optical communication where the user satellite and the relay satellite conduct the inter-satellite communication through optical communication is being discussed.

In the inter-satellite optical communication discussed so far, the user satellite and the relay satellite communicate with each other in accordance with a schedule planned in advance depending on a positional relationship between the relay satellite and the user satellite that travel around different orbits. In the typical inter-satellite optical communication, the relay satellite establishes a communication connection to the predetermined user satellite for a predetermined time period in accordance with the planned schedule and transmits and receives data to and from the user satellite. Specifically, the relay satellite initially transmits an optical beacon to the user satellite serving as a destination at the start of a scheduled time period. Upon receiving the optical beacon, the user satellite establishes the communication connection with the relay satellite serving as a source of the optical beacon. After establishing the communication connection, the relay satellite and the user satellite use optical communication for transmission and reception of data. When no data for transmission and reception remains or when the scheduled time period expires, the relay satellite and the user satellite release the communication connection, and the communication ends.

In the inter-satellite optical communication, spatial optical communication techniques can be applied. For example, JP 2001-203641 discloses a spatial optical transmission device that allows for tracking and orientation in the spatial optical communication. Also, J P 2016-100855 discloses a transceiver that superimposes and transmits data and control information in free-spatial optical communication.

CITATION LIST

Patent Literature

PTL 1

JP 2001-203641

PTL 2

JP 2016-100855

SUMMARY OF INVENTION

Technical Problem

According to the conventional inter-satellite communication, however, a relay satellite and a user satellite such as an earth observation satellite are allowed to communicate with each other only for a time period that is set in advance in accordance with a communication plan (referred to as a communication schedule, a scheduling or the like hereinafter) agreed among operators of the respective satellites, which may degrade flexibility for communication occasions. Accordingly, if certain events occur, for example, in cases of occurrence of disasters such as an earthquake, the operator of the user satellite may desire to obtain observation data from the user satellite shortly in response to occurrence of the events, but there is a problem in that the operator cannot communicate with the desired user satellite in accordance with only the preplanned schedule.

In light of the above-stated problem, one object of the present disclosure is to provide a technique for achieving flexible communication by setting in an on-demand manner a communication occasion that does not exist in a predetermined communication plan in the inter-satellite optical communication.

Solution to Problem

One aspect of the present disclosure relates to a satellite, comprising: an optical signal obtainer that captures an optical beacon transmitted from a relay satellite in response to a communication request received from an earth station; an image processor that retrieves a bright spot in a captured image frame; an optical beacon detector that detects the optical beacon based on a flickering state of the retrieved bright spot; and an optical communicator that establishes inter-satellite optical communication with the relay satellite based on the detected optical beacon.

Advantageous Effects of Invention

According to the present disclosure, the technique for achieving flexible communication by setting in an on-demand manner a communication occasion that does not exist in a predetermined communication plan in the inter-satellite optical communication can be provided.

BRIEF DESCRIPTION OF DRAWINGS

FIG. 7 is a diagram for illustrating a table for storing information regarding bright spots according to one embodiment of the present disclosure;

FIG. 8 is a diagram for illustrating a table for storing information regarding bright spots according to one embodiment of the present disclosure;

FIG. 9 is a diagram for illustrating a table for storing information regarding bright spots according to one embodiment of the present disclosure;

FIG. 11 is a diagram for illustrating a table for storing information regarding bright spots according to one embodiment of the present disclosure;

DESCRIPTION OF EMBODIMENTS

Embodiments of the present disclosure are described below with reference to the drawings.

In embodiments stated below, a satellite system including an earth station, a relay satellite and a user satellite is disclosed. Although the following embodiments are described in conjunction with inter-satellite optical communication between the relay satellite and the user satellite in the satellite system, the present disclosure is not necessarily limited to it and is applicable to the inter-satellite optical communication between two arbitrary satellites.

(Satellite System)

Figure 1:
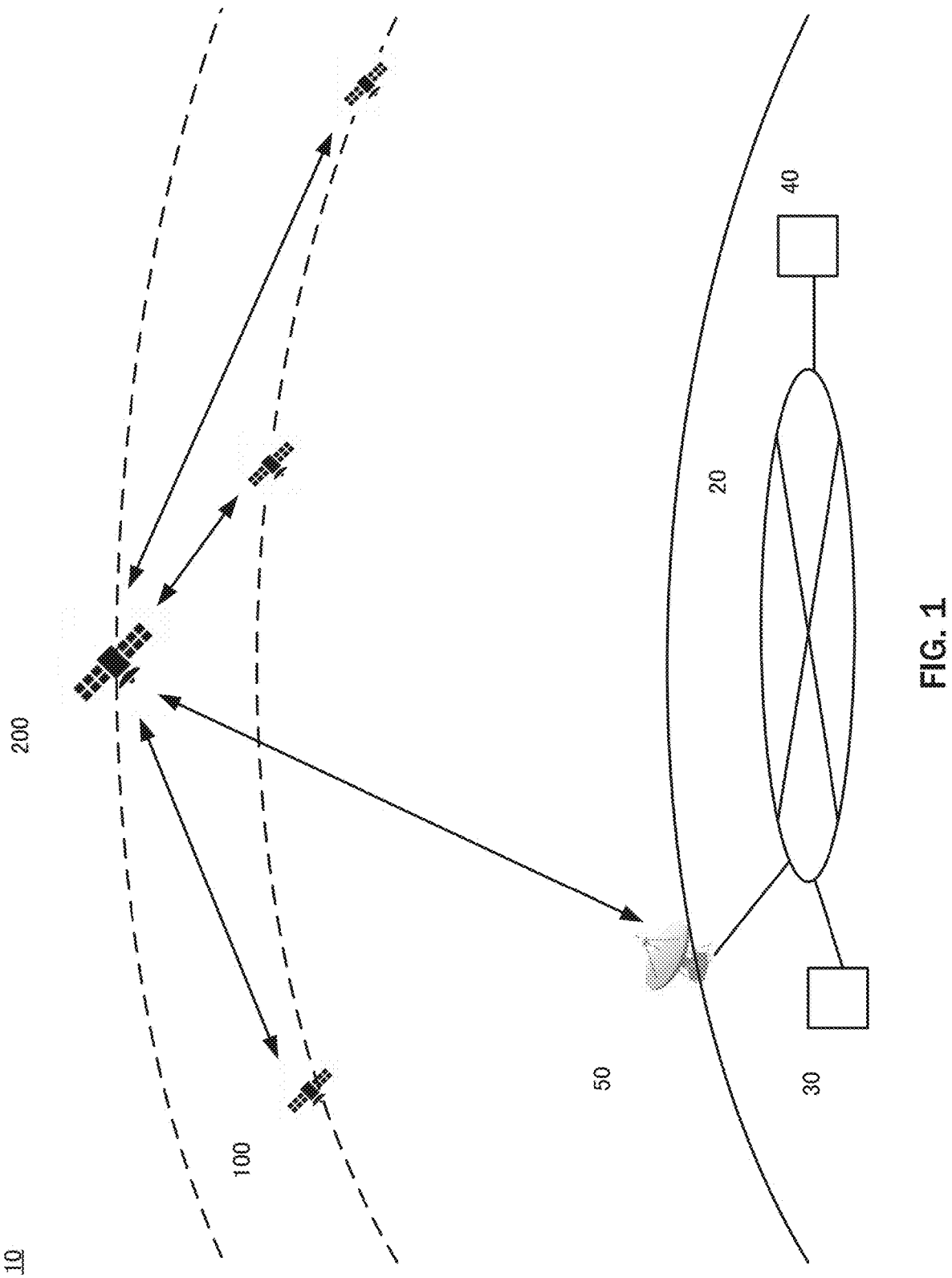
FIG. 1 is a schematic diagram for illustrating user satellites and a relay satellite according to one embodiment of the present disclosure.

As illustrated in FIG. 1, a satellite system 10 includes an earth station 50, user satellites 100 and a relay satellite 200. The user satellites 100 and the relay satellite 200 travel along different orbits around the earth, for example. For example, if the user satellites 100 are observation satellites, the multiple user satellites 100 may travel around the earth in a predetermined constellation (satellite constellation) so that the multiple user satellites 100 can be used to observe an observation targeted area on the earth.

The user satellite 100 may be, but not limited to it, an artificial satellite including predetermined functionalities to travel on an orbit of a predetermined altitude around the earth such as an observation satellite or a communication satellite.

The relay satellite 200 may, but not limited to it, serve as a relay station that travels on an orbit of a higher altitude around the earth than the user satellites 100 for data transmission and reception between the earth station 50 on the earth and the user satellites 100. Typically, the relay satellite 200 may cover the plurality of user satellites 100 and communicate with the desired user satellites 100. For example, the user satellites 100 may travel around a Low Earth Orbit (LEO), and the altitude may range from 20 km to 2,000 km above the earth ground. For example, the relay satellite 200 may travel around a Medium Earth Orbit (MEO), and the altitude may range from 1,000 km to about 36,000 km above the earth ground.

The earth station 50 is a communication station that communicates with the relay satellite 200. In the illustrated example, the earth station 50 is provided on the earth, but the earth station 50 according to the present disclosure may be, but not limited to it, a communication station in a non-terrestrial network (NTN) configured in the stratosphere and so on, for example. For example, the earth station 50 may be communicatively connected to a relay satellite operator 30 and a user satellite operator 40 via a network 20 such as the Internet. Information obtained from the user satellite 100 via the relay satellite 200 is delivered to the relay satellite operator 30 and/or the user satellite operator 20 via the Internet.

Figure 2:
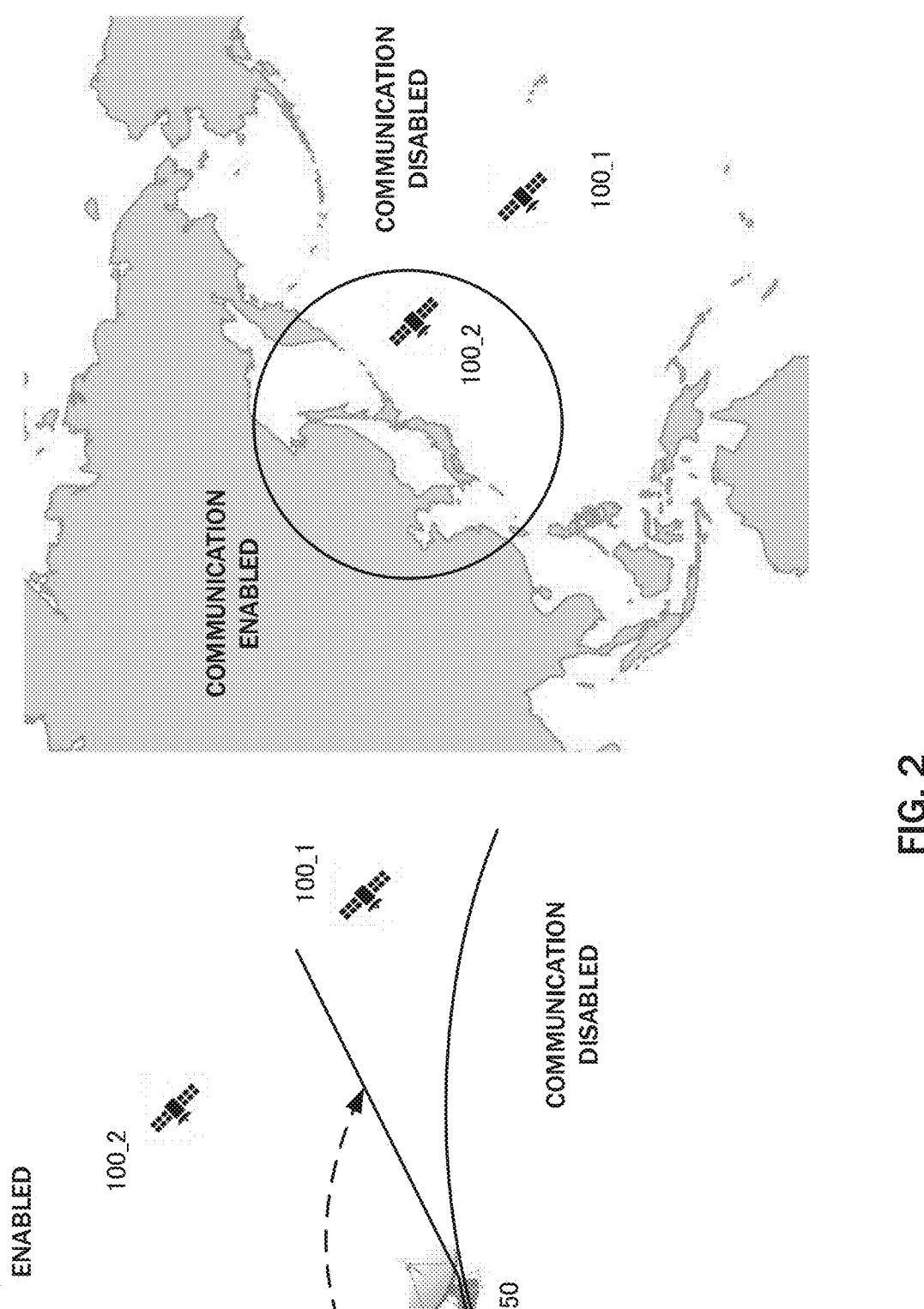
FIG. 2 is a schematic diagram for illustrating a communication enabled area between an earth station and satellites according to one embodiment of the present disclosure.

As illustrated in FIG. 2, a communication coverage area of the earth station 50 with the user satellites is determined by a visible range of the earth station 50. In the illustrated example, the earth station 50 can communicate with the user satellite 100_2 located in a communication enabled area whereas the earth station 50 cannot communicate with the user satellite 100_1 located in a communication disabled area.

Figure 3:
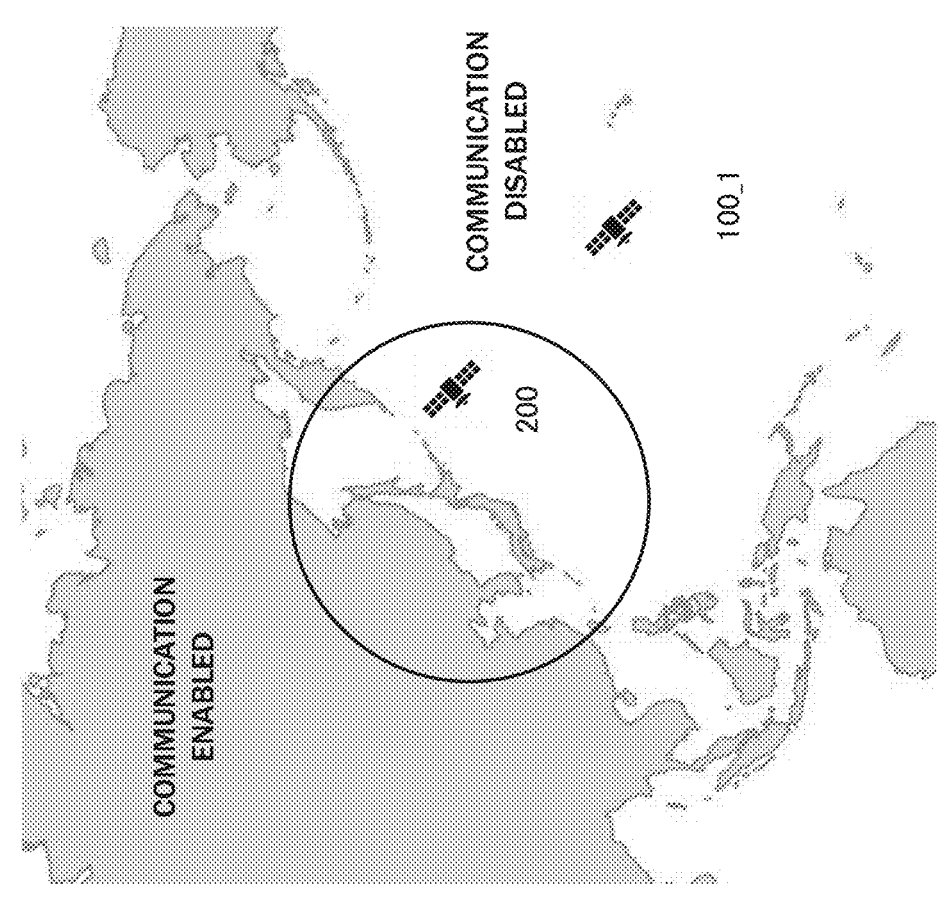
FIG. 3 is a schematic diagram for illustrating communication between an earth station and a user satellite via a relay satellite according to one embodiment of the present disclosure.
Figure 3:
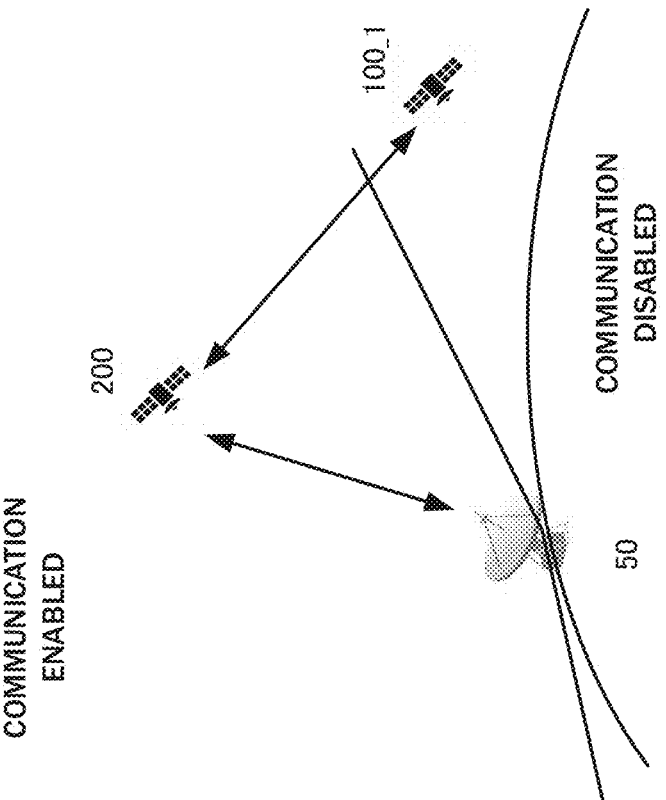

Meanwhile, as illustrated in FIG. 3, the earth station 50 uses the relay station 200 located in the communication enabled area to communicate with the user satellite 100_1 located in the communication disabled area via the relay satellite 200.

(Overview of the Present Disclosure)

The earth station 50 communicates with the user satellite 100 via the relay satellite 200 based on a predetermined schedule. For the schedule, scheduling information for 24 hours from a predefined time in a reference time used by a relay satellite system may be predetermined, for example. The operators 30 and 40 of the relay satellite 200 and the user satellite 100 transmit the scheduling information to the relay satellite 200 and the user satellite 100, respectively. However, the user satellite operator 40 may desire to communicate with the user satellite 100 in a time other than a communication period assigned to the user satellite 100 in accordance with the predetermined schedule. For example, if certain unpredictable events occur, for example, in cases of terrorisms and disasters all over the world such as an earthquake or a tsunami, it may be considered that the user satellite operator 40 desires to collect observation data from the user satellite 100 more shortly than a normal collection timing of observation data. In the following embodiments, some techniques to allow the earth station 50 to conduct instantly responsive communication with the user satellite 100 via the relay satellite 200 in an on-demand manner at an arbitrary timing other than the predetermined communication plan are disclosed.

Specifically, the user satellite operator 40 desires to communicate with the user satellite 100 in a time period other than the prescheduled communication time, and upon receiving a communication request from the user satellite operator 40, the relay satellite operator 30 transmits the communication request for the user satellite 100 to the relay satellite 200 located in an area enabled for communication with the user satellite 100 via the earth station 50. Upon receiving the communication request from the earth station 50, the relay satellite 200 transmits an optical beacon to the orbit around which the user satellite 100 travels. For example, the optical beacon may be a pulse-formed optical signal into which respective identifiers of the relay satellite 200 and the user satellite 100 are encoded. As described in detail below, when the user satellite 100 detects the optical beacon from a captured image frame during capturing outer space with a capturing device such as a camera, the user satellite 100 analyzes a flickering pattern of the detected optical beacon. Then, if it is determined that the user satellite 100 is requested as the communication opponent from the relay satellite 200 based on the analysis result, the user satellite 100 establishes a communication connection to the relay satellite 200 transmitting the optical beacon even in a time period other than the prescheduled communication time and initiates to communicate with the relay satellite 200.

Figure 4:
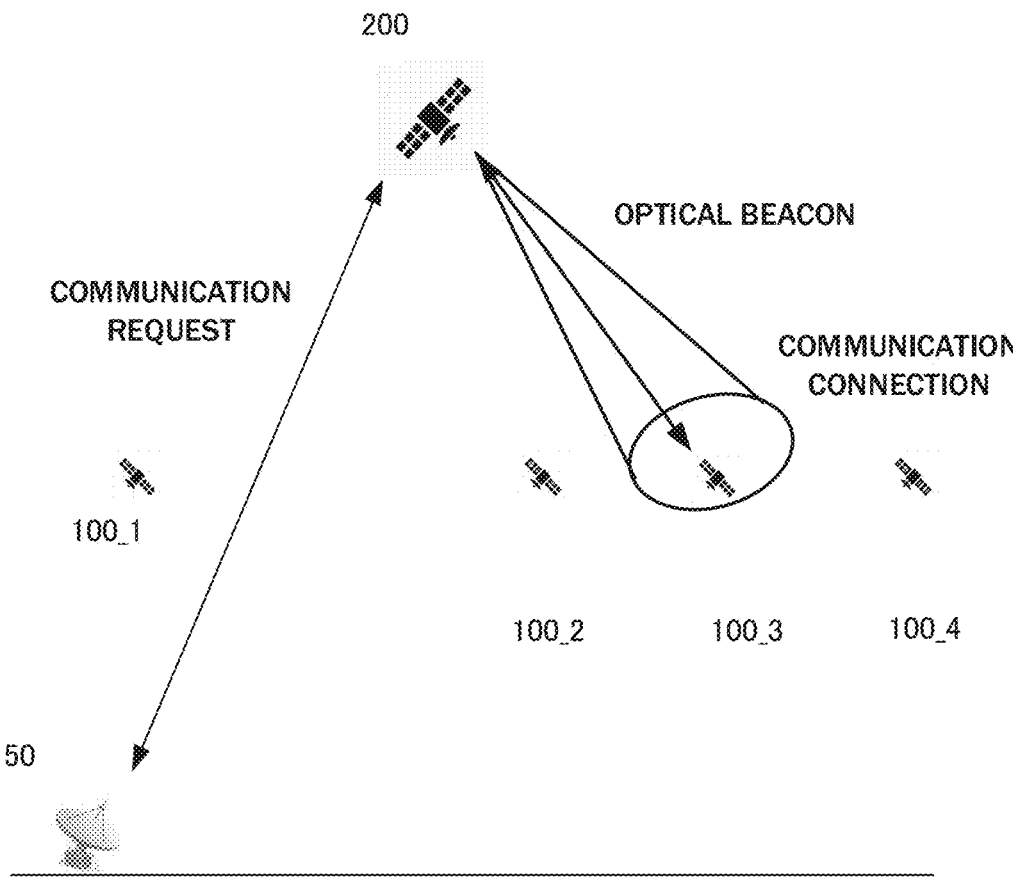
FIG. 4 is a schematic diagram for illustrating a communication establishment procedure according to one embodiment of the present disclosure.

For example, as illustrated in FIG. 4, the earth station 50 may desire to communicate to the user satellite 100_3 and transmit a communication request for communication to the user satellite 100_3 to the relay satellite 200. The relay satellite 200 may transmit an optical beacon for detecting the user satellite 100_3 to an orbit of the user satellites 100_1 to 100_4 (which are collectively referred to as the user satellites 100 hereinafter). For example, the optical beacon may be transmitted toward the location of the user satellite 100 predicted based on orbit prediction data for the user satellites 100 stored in the relay satellite 200 and consist of light with less directivity so that it can cover a wide area including the predicted location. For example, the optical beacon may be composed as a pulse signal into which the identifier of the relay satellite 200 and the identifier of the user satellite 100_3 requested as the communication opponent are encoded.

Upon detecting the optical beacon from the relay satellite 200, the user satellite 100_3 retrieves the identifier of the relay satellite 200 and the identifier of the requested communication opponent from the encoded pulse signal. The user satellite 100_3 determines whether the retrieved identifier of the communication opponent matches its own identifier. In this example, since the identifier of the user satellite 100_3 is included in the optical beacon, the user satellite 100_3 determines that it is requested as the communication opponent and transitions to a communication establishment procedure with the relay satellite 200. When a communication connection between the user satellite 100_3 and the relay satellite 200 has been established in accordance with the predetermined communication establishment procedure, the user satellite 100_3 and the relay satellite 200 transmit and receive data with light with more directivity to and from each other. Also, the optical beacon may be of a certain flickering pattern that does not include the identifier of the relay satellite 200, and in this case, the user satellite 100 detecting the optical beacon may determine from the flickering pattern that the optical beacon has been transmitted from the predetermined relay satellite 200.

In this manner, the earth station 50 can communicate with the desired user satellite 100 via the relay satellite 200 at a desired timing, and the instantly responsive communication can be flexibly achieved compared to conventional techniques where the communication is enabled only in the predetermined time period.

Figure 5:
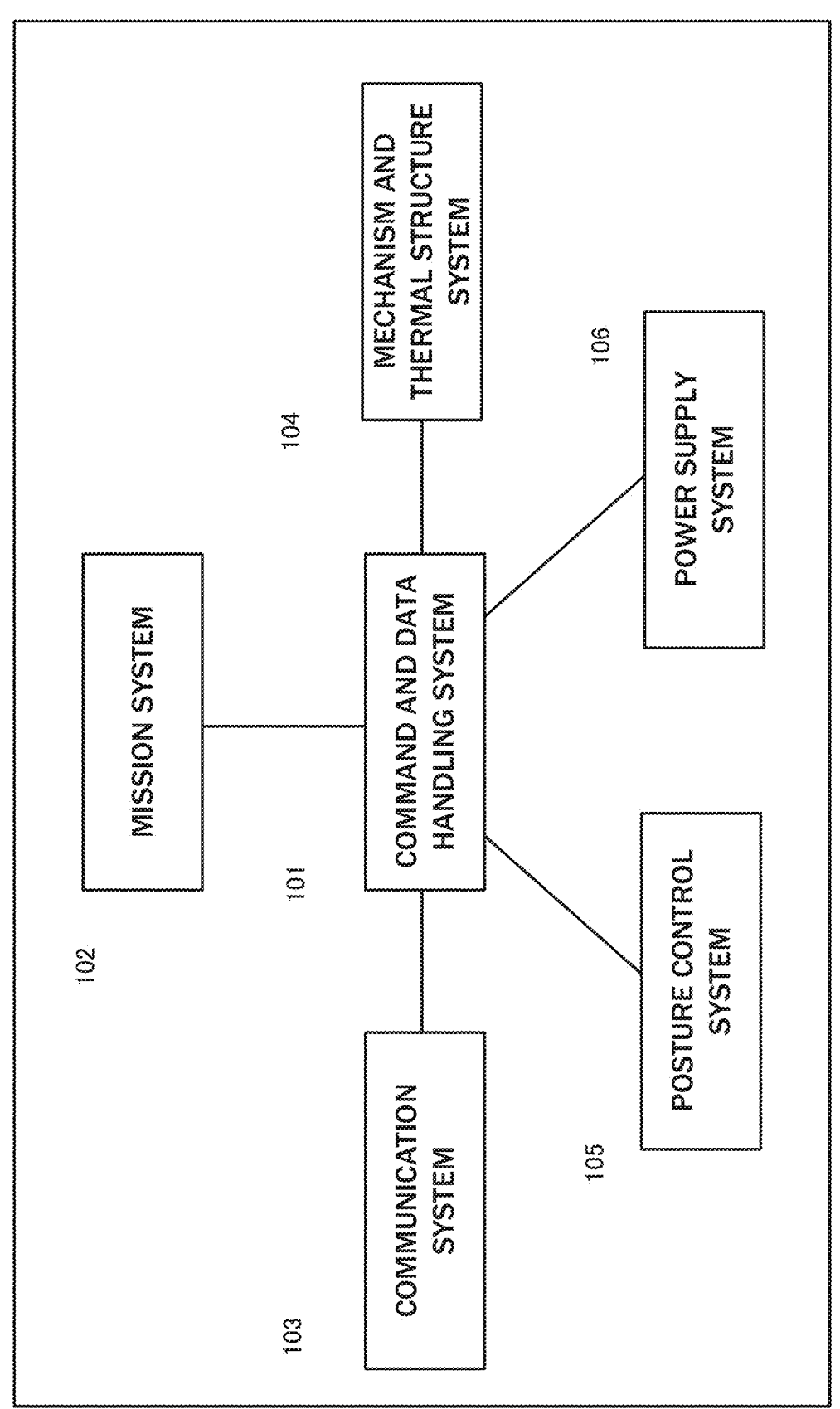
FIG. 5 is a block diagram for illustrating a hardware arrangement of a user satellite and a relay satellite according to one embodiment of the present disclosure.

Here, the user satellite 100 and the relay satellite 200 may have a hardware arrangement as illustrated in FIG. 5, for example. Specifically, each of the user satellite 100 and the relay satellite 200 has a command and data handling system 101, a mission system 102, a communication system 103, a mechanism and thermal structure system 104, a posture control system 105 and a power supply system 106.

The command and data handling system 101 processes received commands as well as status data, mission data or the like for the satellite. For example, the command and data handling system 101 has a processing circuit for data processing and uses the processing circuit to perform various functional units as stated below.

The mission system 102 implements functionalities (missions) specific to the respective satellite. For example, if the satellite is an earth observation satellite, the mission system 102 may be composed of a sensor, a data processer or the like. Also, if the satellite is a communication satellite, the mission system 102 may be composed of an antenna and/or a communication device for relaying data.

The communication system 103 may receive commands from the earth station 50. The communication system 103 may be composed of an antenna and/or a communication device for transmitting states of the satellite, data observed by the satellite, a telemetry or the like to the earth station 50. Also, the communication system 103 in the user satellite 100 may have a camera for capturing a surrounding of the satellite. The communication system 103 may not only receive optical beacons and communication light for inter-satellite optical communication but also capture a non-terrestrial area such as outer space. For example, the camera may always capture the non-terrestrial area of the surrounding of the satellite at a predetermined frame rate (for example, 30 fps) and deliver the captured image frames of the non-terrestrial area to the command and data handling system 101 or the like. Also, the camera may include an omnidirectional lens such as a circumferential fish-eye lens so that a wider area can be captured.

The mechanism and thermal structure system 104 may be composed of a satellite body, movable extensions such as a solar battery panel and a mechanism for stabilizing the inner temperature of the satellite and releasing the heat of the satellite.

The posture control system 105 may be composed of a sensor for measuring the position and/or the posture of the satellite, a thruster for changing the altitude and/or the posture of the satellite or the like. The posture system 105 may control the position and/or the posture of the satellite on the orbit.

The power supply system 106 may control and manage power consumed in the satellite. For example, the power supply system 106 may charge the power generated at a solar battery to a battery and/or supply the required power to the respective systems in the satellite.

However, the above-stated hardware arrangement is merely one example, and the user satellite 100 and the relay satellite 200 according to the present disclosure may be implemented with any other appropriate hardware arrangement. Also, the above-stated grouping into the respective systems is merely one example, and the hardware arrangement of the user satellite 100 and the relay satellite 200 according to other groupings may be described. For example, a certain equipment and mechanism may be grouped into different systems depending on the mission of the satellite. For example, since the relay satellite 200 is mainly intended to relay data with optical communication as its main mission, an optical communication device (for example, a camera, an optical transmitter and so on) and a data relay device may be classified into the mission system 102. On the other hand, if the user satellite 100 is mainly intended to observe the earth as its main mission, various observation sensors, a data processor and so on may be grouped into the mission system 102, and an optical communication device (for example, a camera, an optical transmitter and so on) for communication with the relay satellite 200 may be grouped into the communication system 103.

(User Satellite)

Figure 6:
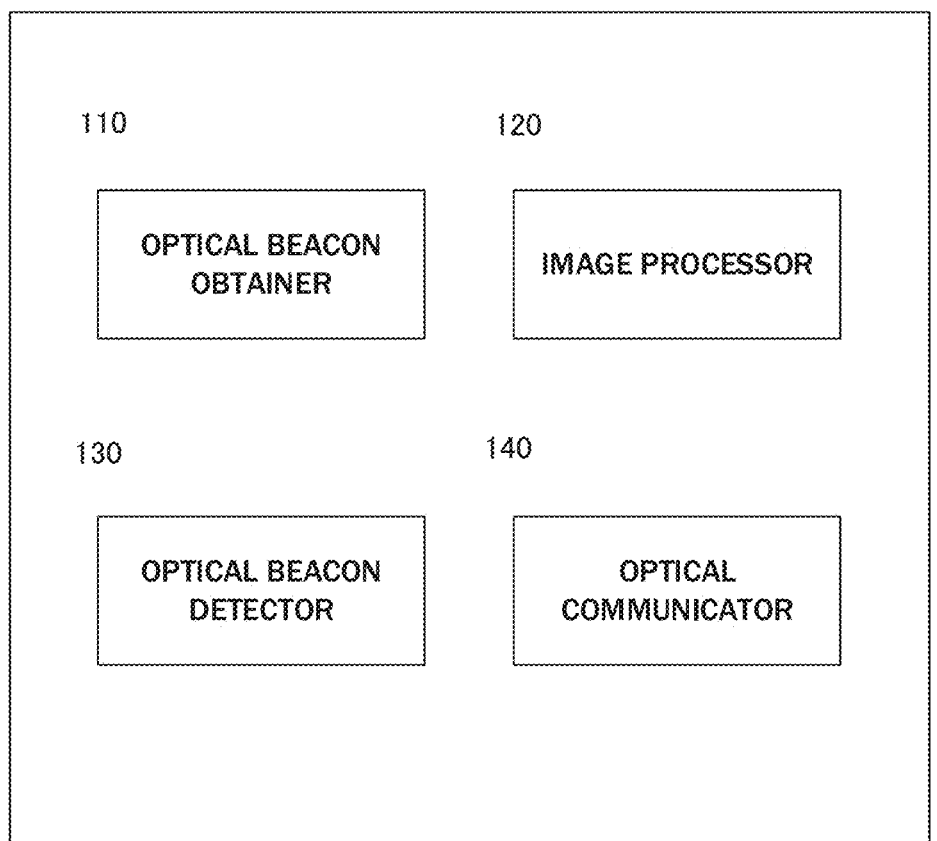
FIG. 6 is a block diagram for illustrating a functional arrangement of a user satellite according to one embodiment of the present disclosure.

Next, the user satellite 100 according to one embodiment of the present disclosure is described with reference to FIG. 6. FIG. 6 is a block diagram for illustrating a functional arrangement of the user satellite 100 according to one embodiment of the present disclosure.

As illustrated in FIG. 6, the user satellite 100 has an optical signal obtainer 110, an image processor 120, an optical beacon detector 130 and an optical communicator 140. The respective functional components can be implemented with any one or combination of the above-stated systems.

The optical signal obtainer 110 captures an optical beacon transmitted from the relay satellite 200 in response to a communication request received from the earth station 50. In this embodiment, in response to the communication request from the earth station 50, the relay satellite 200 transmits an optical beacon toward the orbit of the user satellite 100 requested by the earth station 50. The optical signal obtainer 110 observes an optical signal traveling to the user satellite 100 and obtains the observed optical signal. For example, if the user satellite 100 travels along Low Earth-Orbit (LEO) of a lower altitude above the earth ground and the relay satellite 200 travels along an orbit of a higher altitude, the optical signal obtainer 110 captures an image including an optical signal passing through a non-terrestrial area such as outer space. The outer space herein may be defined as a spatial area that does not belong to the earth and other celestial bodies and represent an outer spatial area above the atmosphere. For example, a camera lens in the user satellite 100 may be controlled to be directed to the relay satellite 200 managing the user satellite 100, and the optical signal obtainer 110 may capture the non-terrestrial area at a predetermined frame rate. In this embodiment, the optical signal obtainer 110 may always capture the non-terrestrial area and observe an optical beacon traveling from the relay satellite 200. The optical signal obtainer 110 forwards the captured image frames for the non-terrestrial area to the image processor 120.

The image processor 120 retrieves a bright spot in the captured image frames. Specifically, the image processor 120 performs preprocessing such as noise reduction, contrast adjustment or the like on the respective image frames obtained from the optical signal obtainer 110.

For a high-sensitivity camera for satellite, some noises may be more likely to be included in a background, and there is a risk that the noises may be erroneously recognized as a star or an optical beacon. For example, the image processor 120 may perform a temporal averaging operation and/or a spatial averaging operation on the image frames for noise reduction. Also, the image processor 120 may perform contrast (offset gain) adjustment to adjust the luminance of the image frames to a proper level so that the to-be-detected bright spot can be better separated from the background.

After performing the preprocessing in this manner, the image processor 120 retrieves a bright spot as an optical beacon candidate from the respective preprocessed image frames. For example, the image processor 120 may perform binarization on the respective image frames to convert the image frame into a two-level image composed of pixels of the background and pixels having the higher luminance than the background. A threshold of the binarization may be set to a luminance level that allows the bright spot such as a star or an optical beacon to be separated from the background. Then, the image processor 120 may retrieve a cluster of high-luminance pixels (bright spot) in the two-level image and label the retrieved bright spot as an optical beacon candidate. The labeled bright spot may be stored in association with various features such as its area (number of pixels), horizontal and vertical sizes, gravity image and/or circularity, for example. For example, the respective retrieved bright spots and the features may be stored in a table form as illustrated in FIG. 7. In the table illustrated in FIG. 7, N bright spots are retrieved in the image frame. Specific label numbers (1 to N) are attached to the respective bright spots as the optical beacon candidates.

Next, the image processor 120 performs filtering on the respective retrieved bright spots based on the features. For example, there is a likelihood that the retrieved bright spots may include the sun, the moon, a satellite structure, a ghost image or the like. Since these bright spots have significantly large areas, the image processor 120 may remove the bright spots having an area larger than or equal to a threshold. Also, the bright spots other than an area that can be considered to be an optical beacon may be removed. If the optical beacon may be detected as having pixels larger than or equal to a predetermined number of pixels, it may be determined that the bright spots having pixels smaller than the predetermined number of pixels may be more possibly noises, and the noises may be removed. Also, since the bright spot of the optical beacon may be considered to be circular or nearly circular, the bright spot having a circularity smaller than a predetermined threshold may be removed. As a result of the above filtering, the image processor 120 can retrieve the optical beacon candidates from the bright spots having high-luminance pixels retrieved from the two-level images. The retrieved optical beacon candidates may be stored in the table form as illustrated in FIG. 8, for example. In the table as illustrated in FIG. 8, as a result of the filtering, M (M<N) bright spots remain as the optical beacon candidates.

Next, the image processor 120 removes stars from the optical beacon candidates. Specifically, the optical beacon candidates retrieved as stated above may include not only the optical beacons but also the stars observed from the user satellite 100. The optical beacons transmitted from the relay satellite 200 may have a predetermined flickering pattern, and the bright spots in a captured sequence of image frames may flicker corresponding to the flickering pattern. On the other hand, the stars are unlikely to flicker in a certain flickering pattern, and it may be considered that the bright spots corresponding to the stars may be present across the respective image frames. Accordingly, the image processor 120 may retrieve the flickering bright spots in the filtered sequence of image frames as the optical beacon candidates and differentiate the retrieved bright spots from the bright spots that exist in every image frame and thus may be considered as stars.

For example, the image processor 120 may separate the bright spots of the optical beacon candidates from the bright spots of stars in accordance with a procedure as set forth. First, the image processor 120 converts the table illustrated in FIG. 8 into a bright spot tracking table as illustrated in FIG. 9. Here, the label numbers in FIG. 8 may be replaced with the tracking numbers in the bright spot tracking table. Then, states indicative of tracking states of the bright spots and types indicative of determined states of bright spots (stars, optical beacon candidates and so on) are added to the bright spot tracking table. Here, the states are initially set as unknown.

Figures 10A, 10B:
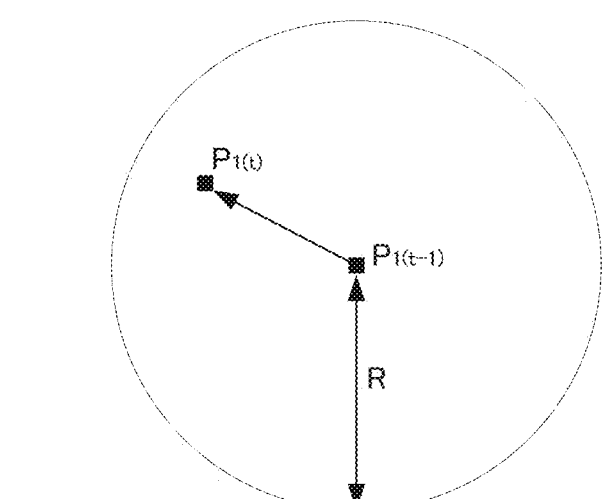
FIGS. 10A and 10B are schematic diagrams for illustrating determination of bright spots according to one embodiment of the present disclosure.

Then, the image processor 120 may refer to the bright spot tracking tables for image frames of the t-th and (t−1)-th time points in the reference time of the satellite system 10 to determine that the bright spots having close gravity coordinates, for example, the bright spots having the distance of gravity coordinates smaller than a predetermined threshold, are the same bright spots. Taking the gravity coordinates of the bright spot labeled as the tracking number i (i=1 to N) at the t-th time point as Pitt), for example, in comparison between the image frame at the t-th time point and the image frame at the (t–1)-th time point to determine whether the bright spot $P_{1(t)}$ in the image frame at the t-th time point, which is a first determination target, is the same as the bright spot $P_{1(t-1)}$ in the image frame at the (t–1)-th time point, if the to-be-determined bright spots $P_{1(t)}$ and $P_{1(t-1)}$ have the positional relationship as illustrated in FIG. 10A, that is, if the bright spot $P_{1(t)}$ is within the radius R from the bright spot $P_{1(t-1)}$, the image processor 120 may determine that the two bright spots Pitt) and $P_{1(t-1)}$ are the same. Here, the radius R may be set to an appropriate value that can be considered as being the same bright spot based on frame rates for image acquisition configured for the optical signal obtainer 110. Also, the radius R may be set to different values corresponding to types (for example, stars, optical beacon candidates or the like) of the bright spots.

Also, the image processor 120 compares the image frame at the t-th time point with the image frame at the (t–1)-th time point to determine whether the second and third to-be-determined bright spots $P_{2(t)}$ and $P_{3(t)}$ in the image frame at the t-th time point and the bright spots $P_{2(t-1)}$ and $P_{3(t-1)}$ in the image frame at the (t–1)-th time point have the positional relationship as illustrated in FIG. 10B. Although only the single bright spot $P_{3(t)}$ exists within the radius R from the bright spot $P_{3(t-1)}$, the two bright spots $P_{2(t)}$ and $P_{3(t)}$ exist within the radius R from the bright spot $P_{2(t-1)}$. In this case, the image processor 120 may first determine the bright point $P_{3(t)}$ existing within the radius R from the bright spot $P_{3(t-1)}$ as being the same as the bright spot $P_{3(t-1)}$ and determine the bright spot $P_{2(t)}$ existing within the radius R from the bright spot $P_{2(t-1)}$ as being the same as the bright spot $P_{2(t-1)}$. However, the identity determination of the bright spots according to the present disclosure is not necessarily limited to it, and for example, the image processor 120 may determine that the bright spots $P_{2(t-1)}$ and $P_{2(t)}$ are the same based on the trend of the traveling direction of adjacent bright spots.

Furthermore, for the bright spot whose type has been determined in the immediately previous image frame, the image processor 120 may retain the type of the bright spot. Also, the image processor 120 may determine the bright spot that cannot be associated with any of the bright spots in the immediately previous image frame among the bright spots detected in the current image frame as a newly occurring bright spot. However, it should be noted that the image processor 120 cannot determine the type of the bright spot at this timing.

In this manner, when the image processor 120 retrieves the bright spots for the optical beacon candidates, the retrieved bright spots are processed by the optical beacon detector 130.

Based on the flickering state of the retrieved bright spot, the optical beacon detector 130 detects an optical beacon transmitted from the relay satellite 200 receiving a communication request from the earth station 50. In this embodiment, in response to the communication request from the earth station 50, the relay satellite 200 transmits an optical beacon to the orbit of the user satellite 100 requested by the earth station 50. The optical beacon detector 130 determines whether the bright spot retrieved by the image processor 120 as the optical beacon candidate is an optical beacon directed to the user satellite 100. For example, the bright spot that does not exist in the immediately previous image frame but exists in the current image frame may be classified as a flickering optical beacon, a newly observed optical beacon, varying optical intensities due to debris reflection, a newly observed star or a noise. The optical beacon detector 130 determines whether the bright spot has been detected in the immediately previous image frame and corresponds to a currently tracked bright spot. If the bright spot does not correspond to the currently tracked bright spot, the optical beacon detector 130 may classify the bright spot as a newly occurring bright spot (optical beacon candidate).

Specifically, the optical beacon detector 130 first performs an optical beacon candidate appearance detection. For example, for the retrieved bright spot, the optical beacon detector 130 determines whether it is a currently tracked flickering bright spot or a newly occurring bright spot with reference to the bright spot tracking table for the immediately previous image frame. The optical beacon detector 130 may store the bright spot tracking table as illustrated in FIG. 11. For each bright spot, the bright spot tracking table has a bright spot presence indicative of presence of the bright spot in the current image frame and a bright spot checking time indicative of the time instant where presence of the corresponding bright spots has been determined. Note that for bright spot data having no tracking number in the bright spot tracking table, the distance of the bright spots between different image frames is calculated as in the appearance detection of a new bright spot, and if the distance is within a traveling area assumed from the elapsed time, the bright spots are determined as being the same as the bright spot having the existing tracking number, and the bright spot tracking table is accordingly updated. Then, the optical beacon detector 130 determines the bright spot having no entry in the bright spot tracking table as a new optical beacon candidate.

Next, the optical beacon detector 130 performs flicker monitoring for the optical beacon candidate. For example, the optical beacon detector 130 may monitor presence of flickering of the bright spot of the optical beacon candidate and determine the type of the bright spot based on the monitoring result. Namely, the optical beacon detector 130 may determine the bright spot flickering at a certain pattern as an optical beacon and exclude other bright spots from the optical beacon candidates.

Specifically, the optical beacon detector 130 determines the bright spot that has not disappeared for a certain time period as a star and excludes it from the optical beacon candidates. Also, the optical beacon detector 130 determines the bright spot that has disappeared for the certain time period and has not appeared again as being lost and deletes the bright spot from the bright spot tracking table. Also, the optical beacon detector 130 performs optical beacon determination as stated below for the bright spot having the luminance level varying at a certain cycle. Also, if the luminance level varies at different cycles or at random, the optical beacon detector 130 may change the type of the bright spot as unknown without deletion from the bright spot tracking table.

Next, the optical beacon detector 130 performs optical beacon determination. Specifically, the optical beacon detector 130 decodes the flickering pattern of the bright spot having the luminance level varying at a certain cycle for reading and retrieves the identifier of the relay satellite 200 and the identifier of the user satellite 100 requested as the communication opponent that are encoded as the flickering pattern. If the retrieved two identifiers match the identifier of the relay satellite 200 managing the user satellite 100 and the identifier of the user satellite 100, the optical beacon detector 130 determines that the optical beacon candidate is an optical beacon directed to its own user satellite 100 and instructs the optical communicator 140 to establish a communication connection to the relay satellite 200. On the other hand, if the retrieved two identifiers do not match the identifier of the relay satellite 200 covering the user satellite 100 and/or the identifier of the user satellite 100, the optical beacon detector 130 determines that the optical beacon candidate is not an optical beacon directed to its own user satellite 100.

Note that the optical beacon detector 130 may further perform optical beacon disappearance monitoring. Specifically, the optical beacon detector 130 continues tracking the bright spot after the optical beacon determination and upon detecting disappearance of the bright spot for a certain time period, ends the tracking. For example, similar to the optical beacon flicker monitoring, the optical beacon detector 130 may delete the optical beacon that has disappeared for the certain time period and has not appeared from the bright spot tracking table.

The optical communicator 140 establishes inter-satellite optical communication with the relay satellite 200 transmitting the optical beacon based on the detected optical beacon. Specifically, when the optical beacon detector 130 detects that the detected optical beacon is for a communication request for the user satellite 100, the optical communicator 140 initiates a communication establishment procedure with the relay satellite 200. For example, the optical communicator 140 transmits an optical signal indicative of a response to the received communication request to the relay satellite 200 and establishes a communication connection between the relay satellite 200 and the user satellite 100 in accordance with the predefined communication establishment procedure. Upon establishing the communication connection, the optical communicator 140 uses communication light to perform the inter-satellite optical communication with the relay satellite 200. Note that if the optical communicator 140 has failed to establish the communication due to some reasons, the optical communicator 140 performs a predetermined number of retries, and the state is transmitted from the relay satellite 200 to the earth station 50 for monitoring at the relay satellite operator 30. If the communication has not been successfully established after the predetermined number of retries, it may be indicated to the user satellite operator 40.

For example, the communication of the relay satellite 200 is scheduled in unit of predetermined slot, and a fixed communication time is assigned to one slot. The fixed communication time may be ten minutes or a fixed time period longer than or shorter than ten minutes. Upon receiving a communication request from the earth station 50, the relay satellite 200 reserves N slots for instantly responsive (on-demand) communication with the user satellite 100 indicated in the received communication request. Here, the number N of reserved slots may be included in the communication request from the earth station 50. Then, the relay satellite 200 encodes the identifier of the user satellite 100 and information indicative of the number N of slots into an optical beacon in transmission of the optical beacon to the indicated user satellite 100. Alternatively, the number N of slots for instantly responsive communication may be set by default in the satellite system 10 (for example, N=1 or the like). In this case, the number N of reserved slots does not need to be included in the communication request from the earth station 50 to the relay satellite 200 and the optical beacon from the relay satellite 200 to the user satellite 100.

Upon receiving, detecting and decoding the optical beacon, the indicated user satellite 100 recognizes the number N of slots for instantly responsive communication based on the decoded optical beacon and is enabled for the instantly responsive communication with the relay satellite 200 within a time period corresponding to the number N of slots. Note that the termination timing for the instantly responsive communication within a time period corresponding to the N slots may be indicated by transmitting a predetermined communication termination sequence from the user satellite 100 to the relay satellite 200.

Here, if the instantly responsive communication is performed, the relay satellite 200 receiving the communication request from the earth station 50 must adjust the communication schedule indicated in advance. The relay satellite 200 may adjust the communication schedule in accordance with the following manners.

Figures 12A, 12B:
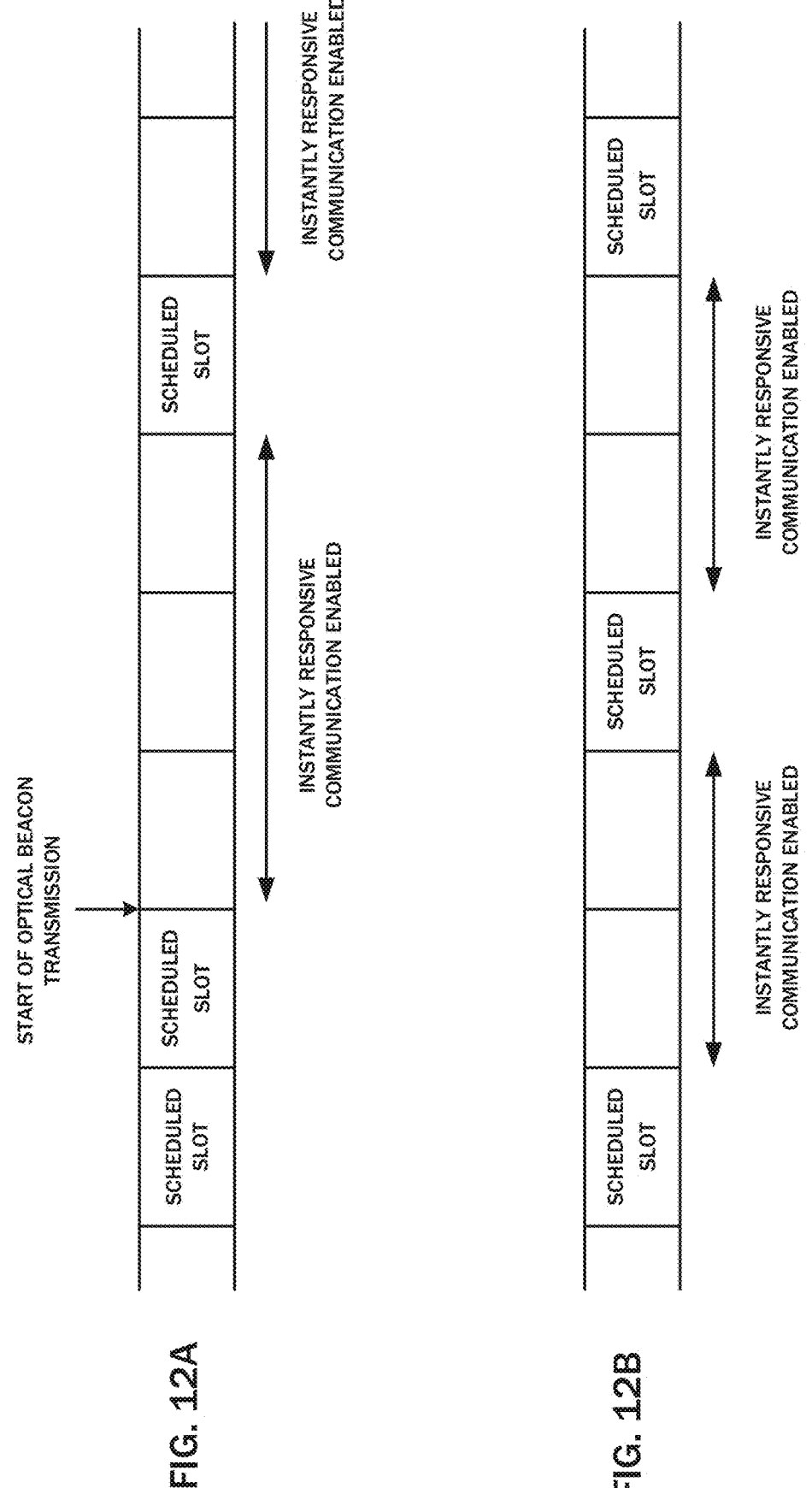
FIGS. 12A and 12B are schematic diagrams for illustrating slot assignment for instantly responsive communication according to one embodiment of the present disclosure.

1) If spare slots exist in the communication schedule indicated in advance, the relay satellite 200 may perform the instantly responsive communication in the spare slot that is available at the earliest timing. Note that N spare slots are required for the instantly responsive communication for N slots. For example, as illustrated in FIG. 12A, the relay satellite 200 may use the spare slot for the earliest timing among the spare slots to initiate the instantly responsive communication.

2) Spare slots for instantly responsive communication are reserved in the indicated communication schedule in advance, and the relay satellite 200 may perform the instantly responsive communication in the spare slot for the earliest timing among the reserved spare slots. Here, the number N of slots for the instantly responsive communication that are available for one communication request is limited to less than or equal to the number of reserved spare slots. For example, as illustrated in FIG. 12B, the communication schedule is set in advance to reserve the spare slots for the instantly responsive communication, and the relay satellite 200 may use the spare slot for the earliest timing among the reserved spare slots to initiate the instantly responsive communication.

Figure 13:
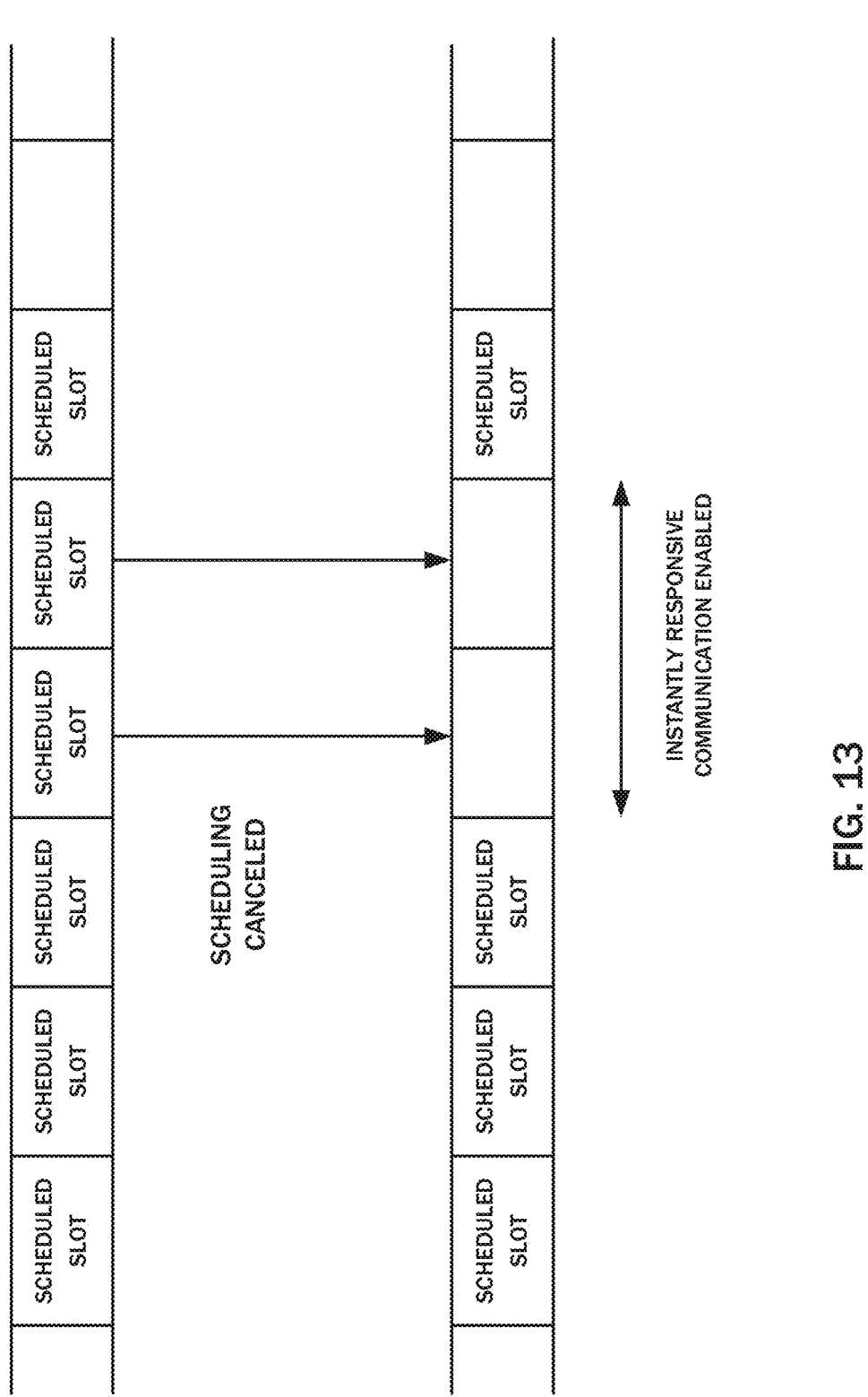
FIG. 13 is a schematic diagram for illustrating slot assignment for instantly responsive communication according to one embodiment of the present disclosure.

3) The relay satellite 200 cancels the communication in the slots reserved for other communications in accordance with the predetermined schedule and performs the instantly responsive communication with the indicated user satellite 100. Here, the number of canceled slots depends on the number N of slots included in the communication request. For example, if the communication schedule as illustrated in FIG. 13 is determined, the relay satellite 200 may cancel the communication of a part of slots (corresponding to two slots in this example) scheduled for other communications in advance to reassign the part to the slots for the instantly responsive communication and initiate the instantly responsive communication.

Note that operations from the bright spot retrieval by the image processor 120 and the optical beacon detector 130 to the optical beacon determination as stated above are not necessarily limited to the above and may be implemented by any other appropriate operations.

For appearance detection of the bright spot, for example, if the bright spot image is almost still between the image frames, reflection of small stars and/or satellite structures, where the image does not change so much, can be canceled by determining a difference between the current image frame and the immediately previous image frame, whereas a newly appearing bright spot and a disappearing bright spot may occur in the image. Accordingly, if the bright spot does not exist in the immediately previous image frame and exists in the current image frame, it can be determined that a new bright spot has appeared or the flickering bright spot has lighted up again. Also, if the bright spot does not exist in the immediately previous image frame and exists in the current image frame, it can be determined that the bright spot has disappeared or the flickering bright spot has lighted off.

Specifically, the image processor 120 performs an inter-image operation on the current image frame and the immediately previous image frame to obtain a difference image between these image frames. The difference of luminance level of respective pixels is represented in the difference image. If the difference of luminance level is zero, the image processor 120 may convert the pixels into intermediate luminance for conversion of the luminance of pixels so that the appearing bright spot can become lighter and the disappearing bright spot can become darker. Alternatively, the absolute value may be converted into the luminance level. In this case, the appearing bright spot cannot be differentiated from the disappearing bright spot, but since the disappearing bright spot has been already tracked, the differentiation is possible. By binarizing the difference image, operations to exclude starts or satellite structures can be omitted.

Alternatively, differences of the traveling speeds of a star and an optical beacon in the image frame sequence may be used to detect the optical beacon. In this case, even if the first appearance of the bright spot cannot be retrieved, the optical beacon candidate can be retrieved.

Alternatively, an area where the relay satellite 200 may exist may be set as a ROI (Region Of Interest) based on orbit information of the relay satellite 200 and the position and the posture of the user satellite 100, and the optical beacon detector 130 may detect the optical beacon candidates only in the ROI area. For example, if it is detected that a new bright spot appears and the position of the bright spot is in the ROI, the optical beacon detector 130 may determine the bright spot as the optical beacon candidate from the relay satellite 200. Accordingly, when the image processor 120 detects appearance of the new bright spot, the optical beacon detector 130 calculates the ROI area where the relay satellite 200 may exist, and if the appearance position is included in the ROI, determines the bright spot as the optical beacon candidate. Alternatively, the image processor 120 may calculate the ROI area in advance and retrieve the bright spot only in the ROI area.
(Relay Satellite)

Figure 14:
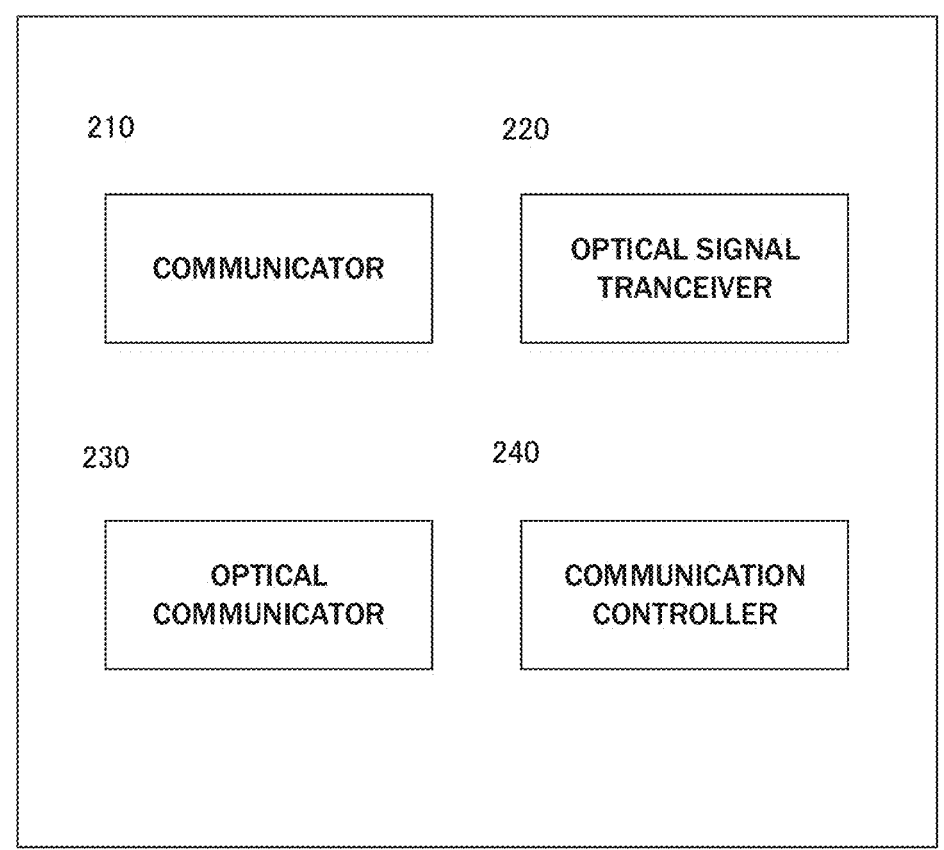
FIG. 14 is a block diagram for illustrating a functional arrangement of a relay satellite according to one embodiment of the present disclosure.

Next, the relay satellite 200 according to one embodiment of the present disclosure is described with reference to FIG. 14. FIG. 14 is a block diagram for illustrating a functional arrangement of the relay satellite 200 according to one embodiment of the present disclosure.

As illustrated in FIG. 14, the relay satellite 200 has a communicator 210, an optical signal transceiver 220, an optical communicator 230 and a communication controller 240. The respective functional units may be implemented with any one or combination of the above-stated systems.

The communicator 210 communicates with the earth station 50. For example, while the relay satellite 200 is located in the communication enabled area with the earth station 50, the communicator 210 may exchange signals with the earth station 50. For example, the communicator 210 may receive a communication schedule for relay to the user satellite 100 from the earth station 50 as well as a communication request for instantly responsive (on-demand) communication with the user satellite 100.

The optical signal transceiver 220 transmits an optical beacon to the user satellite 100 in response to the communication request for the user satellite 100 received from the earth station 50 and receives a response signal from the user satellite 100 detecting the optical beacon. Specifically, when the communicator 210 receives the communication request for instantly responsive communication with the user satellite 100 from the earth station 50, the optical signal transceiver 220 transmits an optical beacon to the user satellite 100. For example, the optical beacon may be a optical signal with less directivity than communication light transmitted after establishing the communication connection. Accordingly, the optical beacon may be transmitted to a wider area than the communication light, and the user satellite 100 can easily receive the optical beacon. Also, if the user satellite 100 has a camera with an omnidirectional lens, the optical beacon transmitted from the relay satellite 200 can be easily received.

Also, the optical signal transceiver 220 may encode the identifier of the user satellite 100 indicated in the communication request and the identifier of the relay satellite 200 into an optical beacon and transmit the optical beacon indicative of these identifiers to the user satellite 100. For example, the optical signal transceiver 220 may transmit the optical beacon having a predetermined flickering pattern indicative of the encoded information. Upon receiving the optical beacon, the user satellite 100 may determine whether the received optical beacon is directed to its own satellite and if the optical beacon is directed to the satellite, transmit a response signal to the relay satellite 200. The identifier of the user satellite 100 and the identifier of the relay satellite 200 are encoded into the response signal, and the relay satellite 200 can determine whether the received response signal is the response signal directed to its own satellite.

Also, when the optical signal transceiver 220 transmits an optical beacon to the indicated user satellite 100, the optical signal transceiver 220 may further encode information indicative of the number N of slots into the optical beacon. For example, the communication schedule for the relay satellite 200 may be determined in unit of predefined slot, and a fixed communication time may be assigned to one slot. The fixed communication time may be ten minutes or a fixed time period longer than or shorter than ten minutes, for example.

The optical communicator 230 establishes inter-satellite optical communication with the user satellite 100 based on reception of a response signal. Specifically, upon receiving the response signal to the optical beacon from the user satellite 100, the optical communicator 230 establishes a communication connection in accordance with a communication establishment procedure predefined between the relay satellite 200 and the user satellite 100. Upon establishing the communication connection, the optical communicator 230 uses communication light to perform the inter-satellite optical communication with the user satellite 100.

For example, upon receiving a communication request from the earth station 50, the optical communicator 230 may reserve N slots for instantly responsive (on-demand) communication with the user satellite 100 indicated in the received communication request, as stated above. Here, the number N of reserved slots may be included in the communication request from the earth station 50. Alternatively, the number N of slots for instantly responsive communication may be set by default in the satellite system 10 (for example, N=1). In this case, the communication request does not need to include the number N of reserved slots.

If the instantly responsive communication is performed, the optical communicator 230 needs to adjust the communication schedule indicated in advance. The optical communicator 230 may adjust the communication schedule in accordance with the above-stated manner.

1) If spare slots are in the indicated communication schedule, the optical communicator 230 may perform the instantly responsive communication in the spare slot that is available at the earliest timing.
  2) Spare slots for instantly responsive communication are reserved in the indicated communication schedule in advance, and the optical communicator 230 may perform the instantly responsive communication in the spare slot for the earliest timing among the reserved spare slots.
  3) The optical communicator 230 cancels the communication in the scheduled slot and performs the instantly responsive communication in the slot.

The communication controller 240 uses the communicator 210 to relay data received from the user satellite 100 in the inter-satellite optical communication to the earth station 50. Specifically, when the optical communicator 230 receives the data from the user satellite 100, the communication controller 240 instructs the communicator 210 to transmit the received data to the earth station 50. Here, the transmission timing to the earth station 50 may be immediately after receiving the data from the user satellite 100. Alternatively, the data received from the user satellite 100 may be temporarily buffered, and the communication controller 240 may instruct the communicator 210 to transmit the buffered data to the earth station 50 at a subsequent appropriate timing.

(Optical Beacon Detection Operation)

Figure 15:
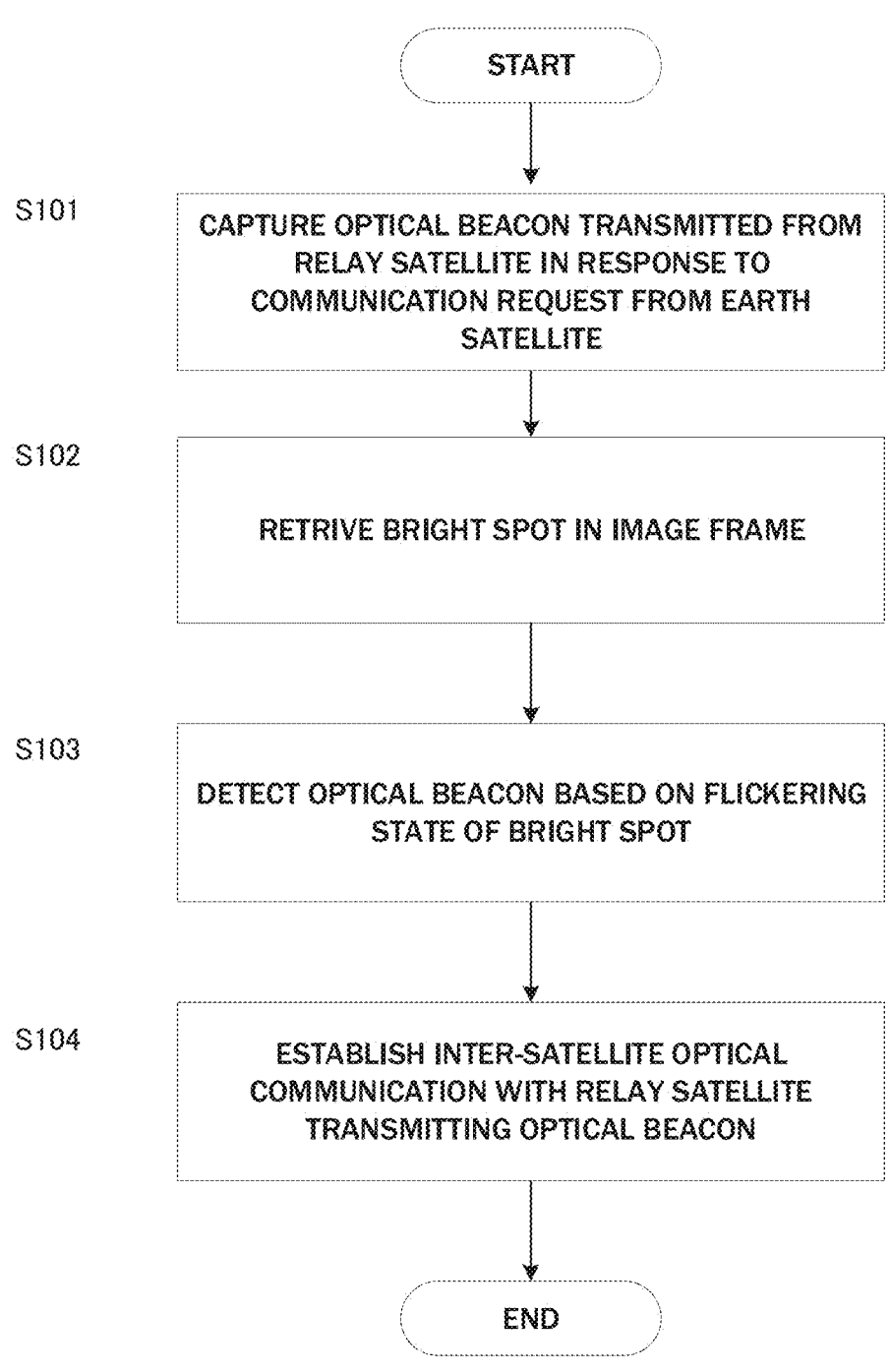
FIG. 15 is a flowchart for illustrating an on-demand communication operation according to one embodiment of the present disclosure.

Next, an on-demand communication operation according to one embodiment of the present disclosure is described with referenced to FIG. 15. The on-demand communication operation is performed by the above-stated user satellite 100.

FIG. 15 is a flowchart for illustrating an on-demand communication operation according to one embodiment of the present disclosure.

As illustrated in FIG. 15, at step S101, the user satellite 100 captures an optical beacon transmitted from the relay satellite 200 in response to a communication request received from the earth station 50. Specifically, the user satellite 100 captures a non-terrestrial area such as outer space around the user satellite 100 at a predetermined frame rate to obtain an image frame sequence. Here, the user satellite 100 may capture the non-terrestrial area with an omnidirectional lens so that the optical beacon from the relay satellite 200 can be retrieved from the captured wide area.

At step S102, the user satellite 100 retrieves a bright spot in the captured image frames. Specifically, the user satellite 100 performs preprocessing on the respective image frames such as noise reduction, filtering or the like and retrieves the bright spot that may be an optical beacon candidate in the image frames. At this time, the user satellite 100 may calculate various features for the retrieved bright spot such as the area, the gravity coordinates, the size, the circularity and so on.

Figure 16:
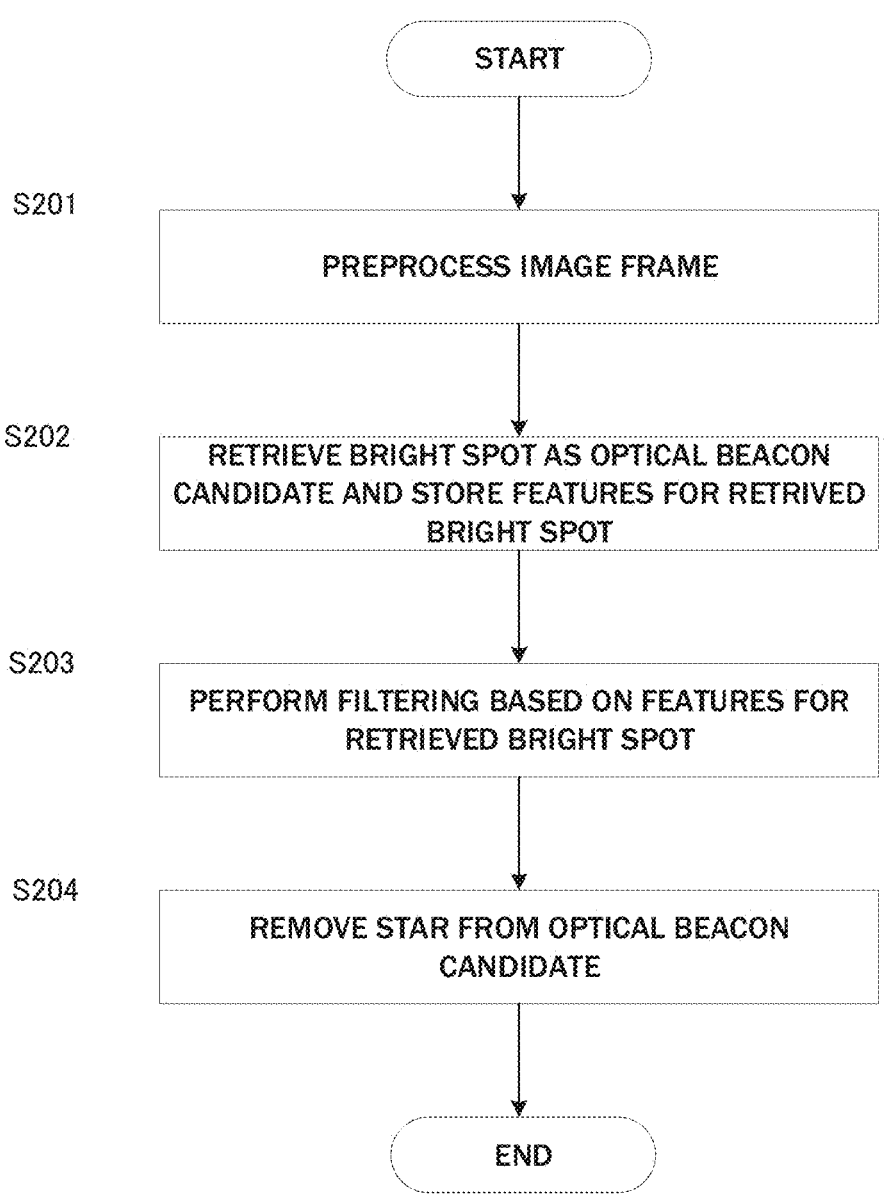
FIG. 16 is a flowchart for illustrating a bright spot extraction operation according to one embodiment of the present disclosure.

More specifically, the user satellite 100 may perform the bright spot retrieval operation as illustrated in FIG. 16. As illustrated in FIG. 16, at step S201, the user satellite 100 preprocesses the image frames. Specifically, the user satellite 100 performs preprocessing on the respective image frames such as noise reduction, contrast adjustment or the like to remove a background noise or others. For example, the user satellite 100 may perform a temporal averaging operation and/or a spatial averaging operation on the image frames. Also, the user satellite 100 may perform the contrast (offset gain) adjustment to adjust the luminance of the image frames to an appropriate level so that the background can be better separated from the to-be-detected bright spot.

At step S202, the user satellite 100 retrieves the bright spot as the optical beacon candidate and stores the features for the retrieved bright spot. For example, the user satellite 100 may perform binarization on the respective image frames to convert the image frames into two-level images composed of background pixels and pixels having higher luminance than the background. A threshold for the binarization may be set to a luminance level that allows the bright spots such as stars or optical beacons to be separated from the background properly. Furthermore, the user satellite 100 retrieves the bright spot in the two-level image and labels the retrieved bright spot as the optical beacon candidate. The labeled bright spot may be stored in a table form as illustrated in FIG. 7 in association with various features such as the area (the number of pixels), the vertical and horizontal sizes, the gravity coordinates, the circularity and so on, for example.

At step S203, the user satellite 100 performs filtering on the retrieved respective bright spots based on the features. For example, there is a likelihood that the sun, the moon, a satellite structure, a ghost image or the like may be included in the retrieved bright spot. Since the retrieved bright spot has a significantly large area, the user satellite 100 may remove the bright spot having the area larger than or equal to a threshold. Also, the user satellite 100 may remove the bright spot other than the area considered as the optical beacon. If the optical beacon may be detected as being more than or equal to a predetermined number of pixels, the bright spot having less than the number of pixels may be determined and removed as being likely to be a noise. Also, since the bright spot for the optical beacon may be considered to be circular or almost circular, the bright spot having the circularity less than a predetermined threshold may be removed. According to such filtering, the user satellite 100 can retrieve the optical beacon candidate from the bright spot having high-luminance pixels retrieved from the two-level image. The retrieved optical beacon candidate may be stored in the table form as illustrated in FIG. 8, for example.

At step S204, the user satellite 100 removes a star from the optical beacon candidate. For example, the user satellite 100 may retrieve the flickering bright spot existing in the filtered respective image frames as the optical beacon candidate and remove the star from the optical beacon candidate by differentiation from the bright spot in the respective image frames that may be estimated as the star. In this manner, upon retrieving the optical beacon candidate, the user satellite 100 proceeds to step S103 and retrieves the optical beacon from the optical beacon candidate based on the flickering state of the retrieved bright spot.

At step S103, the user satellite 100 detects the optical beacon transmitted from the relay satellite 200 in response to a communication request received from the earth station 50, based on the flickering state of the retrieved bright spot. In this embodiment, for example, when the earth station 50 desires to communicate with the user satellite 100 in a time period other than the scheduled one, the earth station 50 transmits the communication request for the user satellite 100 to the relay satellite 200. Upon receiving the communication request from the earth station 50, the relay satellite 200 transmits an optical beacon to the orbit of the user satellite 100 to establish a communication connection with the indicated user satellite 100. For example, the optical beacon may be a flickering pulse signal indicative of the identifier of the relay satellite 200 and the identifier of the user satellite 100. The user satellite 100 may retrieve the flickering bright spot as the optical beacon candidate from the preprocessed image frame sequence and if the identifier included in the flickering pattern of the retrieved bright spot matches the identifier of the user satellite 100, determine that the flickering bright spot is the optical beacon for the user satellite 100.

At step S104, the user satellite 100 establishes inter-satellite optical communication with the relay satellite 200 transmitting the optical beacon based on the detected optical beacon. Specifically, the user satellite 100 establishes the communication connection with the relay satellite 200 in accordance with a predefined communication establishment procedure in the satellite system 10 and performs the inter-satellite optical communication through transmission and reception of communication light via the established communication connection.

According to the above-stated embodiments, the user satellite 100 and the relay satellite 200 can perform the inter-satellite optical communication in arbitrary time periods as well as in the scheduled communication time. Namely, in response to a communication request received from the earth station 50 at an arbitrary timing, data obtained by the desired user satellite 100 via the relay satellite 200 can be forwarded to the earth station 50.

Note that the following appendices are further disclosed in conjunction with the above description.

Appendix 1

A satellite, comprising:
an optical signal obtainer that captures an optical beacon transmitted from a relay satellite in response to a communication request received from an earth station;
an image processor that retrieves a bright spot in a captured image frame;
an optical beacon detector that detects the optical beacon based on a flickering state of the retrieved bright spot; and
an optical communicator that establishes inter-satellite optical communication with the relay satellite based on the detected optical beacon.

Appendix 2

The satellite as claimed in appendix 1, wherein the optical signal obtainer includes a camera with an omnidirectional lens.

Appendix 3

The satellite as claimed in appendix 1 or 2, wherein the optical beacon includes a predetermined flickering pattern including identification information of the relay satellite and identification information of the satellite.

Appendix 4

The satellite as claimed in any one of appendices 1 to 3, wherein upon determining that the retrieved bright spot has a predetermined flickering pattern, the optical beacon detector determines that the bright spot is an optical beacon traveling from the relay satellite.

Appendix 5

A satellite system, comprising:
an earth station;
a satellite; and
a relay satellite that relays between the earth station and the satellite,
wherein the satellite comprises:
an optical signal obtainer that captures an optical beacon transmitted from the relay satellite in response to a communication request received from the earth station;
an image processor that retrieves a bright spot in a captured image frame;
an optical beacon detector that detects the optical beacon based on a flickering state of the retrieved bright spot; and
an optical communicator that establishes inter-satellite optical communication with the relay satellite based on the detected optical beacon.

Appendix 6

An optical beacon detection method implemented by a satellite, the method comprising:
capturing an optical beacon transmitted from a relay satellite in response to a communication request received from an earth station;
retrieving a bright spot in a captured image frame;
detecting the optical beacon based on a flickering state of the retrieved bright spot; and
establishing inter-satellite optical communication with the relay satellite based on the detected optical beacon.

Appendix 7

A relay satellite, comprising:
a communicator that communicates with an earth station;
an optical signal transceiver that, in response to a communication request for a satellite received from the earth station, transmits an optical beacon to the satellite and receives a response signal from the satellite detecting the optical beacon;
an optical communicator that establishes inter-satellite optical communication with the satellite based on reception of the response signal; and
a communication controller that uses the communicator to relay data received from the satellite in the inter-satellite optical communication to the earth station.

Appendix 8

The relay satellite as claimed in appendix 7, wherein the optical beacon has a predetermined flickering pattern including identification information of the relay satellite and identification information of the satellite.

Appendix 9

The relay satellite as claimed in appendix 7 or 8, wherein the optical signal transceiver transmits an optical beacon including a predetermined flickering pattern.

Appendix 10

The relay satellite as claimed in appendix 7, wherein if inter-satellite optical communication is performed based on a predetermined communication schedule and a communication request for a satellite is received from the earth station, the optical communicator uses spare time in the communication schedule to establish the inter-satellite optical communication with the satellite.

Appendix 11

The relay satellite as claimed in appendix 7, wherein if inter-satellite optical communication is performed based on a predetermined communication schedule and a communication request for a satellite is received from the earth station, the optical communicator establishes the inter-satellite optical communication with the satellite prior to the communication schedule.

Appendix 12

A data relay method implemented by a relay satellite, the method comprising:

in response to a communication request for a satellite received from an earth station, transmitting an optical beacon to the satellite;

receiving a response signal from the satellite detecting the optical beacon;

establishing inter-satellite optical communication with the satellite based on reception of the response signal; and relaying data received from the satellite in the inter-satellite optical communication to the earth station.

Appendix 13

A data relay method implemented by a relay satellite, the method comprising:

performing inter-satellite optical communication based on a predetermined communication schedule;

upon receiving a communication request for a satellite received from an earth station, reserving an instantly responsive communication time to respond to the communication request;

in response to the communication request, transmitting an optical beacon to the satellite;

receiving a response signal from the satellite detecting the optical beacon;

establishing inter-satellite optical communication with the satellite based on reception of the response signal;

receiving data from the satellite in the inter-satellite optical communication within the instantly responsive communication time; and relaying the data to the earth station.

Although the embodiments of the present disclosure have been described in detail above, the present disclosure is not limited to the above-stated certain embodiments, various variations and alterations can be made within the spirit of the present disclosure as recited in the claims.

The disclosure of Japanese Patent Application No. 2021-215075, filed on Dec. 28, 2021, including the specification, drawings and abstract, is incorporated herein by reference in its entirety.

REFERENCE SIGNS LIST

10. Satellite system
50. Earth station
100. User satellite
110. Optical signal obtainer
120. Image processor 130. Optical beacon detector
140. Optical communicator
200. Relay satellite
210. Communicator
220. Optical signal transceiver
230. Optical communicator
240. Communication controller

The invention claimed is:

1. A relay satellite, comprising:

a communicator that communicates with an earth station;

an optical signal transceiver that, in response to a communication request for a satellite received from the earth station, transmits an optical beacon to the satellite and receives a response signal from the satellite detecting the optical beacon;

an optical communicator that establishes inter-satellite optical communication with the satellite based on reception of the response signal; and a communication controller that uses the communicator to relay data received from the satellite in the inter-satellite optical communication to the earth station, wherein the optical communicator performs inter-satellite optical communication based on a predetermined communication schedule and upon receiving a communication request for a satellite from the earth station, establishes inter-satellite optical communication with the satellite with priority over the predetermined communication schedule.

2. The relay satellite as claimed in claim 1, wherein the optical beacon has a predetermined flickering pattern including identification information of the relay satellite and identification information of the satellite.

3. The relay satellite as claimed in claim 1, wherein the optical signal transceiver transmits an optical beacon including a predetermined flickering pattern.

4. A relay satellite, comprising:

a communicator that communicates with an earth station;

an optical signal transceiver that, in response to a communication request for a satellite received from the earth station, transmits an optical beacon to the satellite and receives a response signal from the satellite detecting the optical beacon;

an optical communicator that establishes inter-satellite optical communication with the satellite based on reception of the response signal; and a communication controller that uses the communicator to relay data received from the satellite in the inter-satellite optical communication to the earth station, wherein the optical communicator performs inter-satellite optical communication based on a predetermined communication schedule and upon receiving a communication request for a satellite from the earth station, uses spare time in the communication schedule to establish inter-satellite optical communication with the satellite.

5. The relay satellite as claimed in claim 4, wherein the optical beacon has a predetermined flickering pattern including identification information of the relay satellite and identification information of the satellite.

6. The relay satellite as claimed in claim 4, wherein the optical signal transceiver transmits an optical beacon including a predetermined flickering pattern.

7. A data relay method implemented by a relay satellite, the method comprising:

transmitting, in response to a communication request for a satellite received from an earth station, an optical beacon to the satellite;

receiving a response signal from the satellite detecting the optical beacon;

establishing inter-satellite optical communication with the satellite based on reception of the response signal; and relaying data received from the satellite in the inter-satellite optical communication to the earth station, wherein the establishing comprises performing inter-satellite optical communication based on a predetermined communication schedule and upon receiving a communication request for a satellite from the earth station, using spare time in the communication schedule to establish inter-satellite optical communication with the satellite.

8. A data relay method implemented by a relay satellite, the method comprising:

transmitting, in response to a communication request for a satellite received from an earth station, an optical beacon to the satellite;

receiving a response signal from the satellite detecting the optical beacon;

establishing inter-satellite optical communication with the satellite based on reception of the response signal; and relaying data received from the satellite in the inter-satellite optical communication to the earth station, wherein the establishing comprises performing inter-satellite optical communication based on a predetermined communication schedule and upon receiving a communication request for a satellite from the earth station, establishes inter-satellite optical communication with the satellite with priority over the communication schedule.

9. A data relay method implemented by a relay satellite, the method comprising:

performing inter-satellite optical communication based on a predetermined communication schedule;

upon receiving a communication request for a satellite received from an earth station, determining an instantly responsive communication time that is not scheduled in the predetermined communication schedule;

in response to the communication request, transmitting an optical beacon to the satellite;

receiving a response signal from the satellite detecting the optical beacon;

establishing inter-satellite optical communication with the satellite based on reception of the response signal;

receiving data from the satellite in the inter-satellite optical communication within the instantly responsive communication time; and relaying the data to the earth station.

10. A relay satellite, comprising:

a communicator that communicates with an earth station;

an optical signal transceiver that transmits an optical beacon to a satellite and receives a response signal from the satellite detecting the optical beacon;

an optical communicator that in response to the response signal, establishes inter-satellite optical communication with the satellite based on a predetermined communication schedule; and a communication controller that receives data from the satellite in the inter-satellite optical communication and uses the communicator to relay the data to the earth station, wherein in response to a communication request for the satellite received from the earth station, the optical signal transceiver transmits the optical beacon to the satellite, and in response to the communication request, the optical communicator further determines an instantly responsive communication time that is not scheduled in the predetermined communication schedule to establish inter-satellite optical communication with the satellite in the instantly responsive communication time.

11. A data relay method implemented by a relay satellite, the method comprising:

performing inter-satellite optical communication based on a predetermined communication schedule;

upon receiving a communication request for a satellite received from an earth station, determining an instantly responsive communication time with priority over the predetermined communication schedule;

in response to the communication request, transmitting an optical beacon to the satellite;

receiving a response signal from the satellite detecting the optical beacon;

establishing inter-satellite optical communication with the satellite based on reception of the response signal;

receiving data from the satellite in the inter-satellite optical communication within the instantly responsive communication time; and relaying the data to the earth station.

12. A relay satellite, comprising:

a communicator that communicates with an earth station;

an optical signal transceiver that transmits an optical beacon to a satellite and receives a response signal from the satellite detecting the optical beacon;

an optical communicator that in response to the response signal, establishes inter-satellite optical communication with the satellite based on a predetermined communication schedule; and a communication controller that receives data from the satellite in the inter-satellite optical communication and uses the communicator to relay the data to the earth station, wherein in response to a communication request for the satellite received from the earth station, the optical signal transceiver transmits the optical beacon to the satellite, and in response to the communication request, the optical communicator further determines an instantly responsive communication time with priority over the predetermined communication schedule to establish inter-satellite optical communication with the satellite in the instantly responsive communication time.

* * * * *